Dec. 6, 1955 J. E. EVANS 2,726,289

ELECTROSTATIC RECORDING AND REPRODUCING SYSTEM

Filed July 27, 1951

INVENTOR
John E. Evans
BY J. L. Whittaker
ATTORNEY

United States Patent Office 2,726,289

Patented Dec. 6, 1955

2,726,289

ELECTROSTATIC RECORDING AND REPRODUCING SYSTEM

John E. Evans, Princeton, N. J., assignor to Radio Corporation of America, a corporation of Delaware Application July 27, 1951, Serial No. 238,927

6 Claims. (Cl. 179—100.3)

This invention relates generally to signal storage systems and more particularly to rotatable storage means for the static recording and delay of a plurality of sequentially occurring events.

Previous signal recording and delay systems generally include storage tubes and/or cumbersome and unwieldly electro-mechanical delay lines. Since storage tubes are relatively expensive and include complicated associated structure and since the aforesaid delay lines usually tend to distort signals propagated therein, a better and more simple system is hereinafter disclosed and claimed.

According to the present invention, electrical signals are translated into corresponding light-ray signals which are recorded on a rotatable photoconductive storage element. At a given time during the rotation thereof, the recorded signals are detected for subsequent use. The time delay obtained is then a function of the speed of rotation of the storage element and of the physical positioning of the signal detecting means. Since the recorded signals are not propagated through a conductive medium but are static, distortion of the subsequently detected signals is reduced. A further feature of the invention is that the system signal-to-noise ratio is improved since the photoconductive signal recording means utilized obviates grain structure difficulties usually encountered in recording media such as magnetic tape and photo-emulsion.

One of the objects of the present invention is to provide an improved system for recording and delaying a plurality of sequentially occurring events.

Another object of the invention is to provide an improved system photoelectrically responsive to a plurality of sequentially occurring events for the recording and delay thereof.

Another object of the invention is to provide a system for recording and delaying a plurality of sequentially occurring photoelectric events in which system the medium for the recording and delay thereof is continuously rotatable.

A further object of the invention is to provide a system for combining different sets of individually recorded and delayed photoelectrically produced signals.

A still further object of the invention is to improve the signal-to-noise ratio of signal recording and delay systems.

Figure 1:
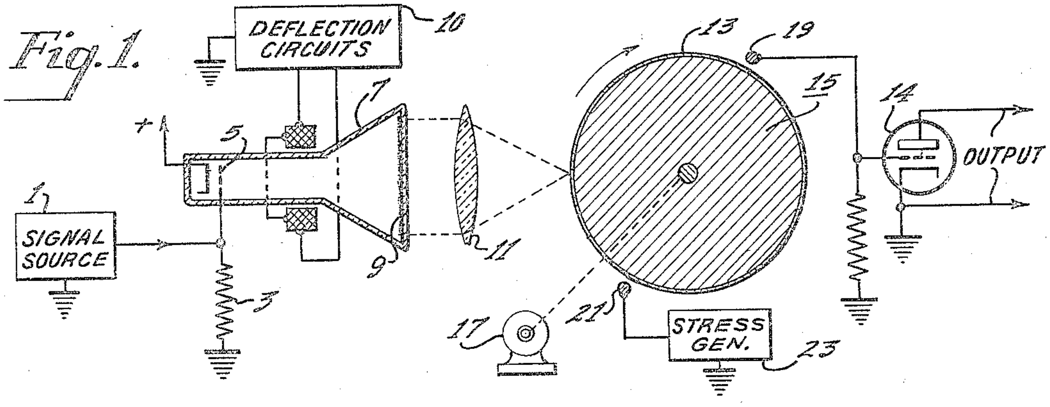
Figure 2:
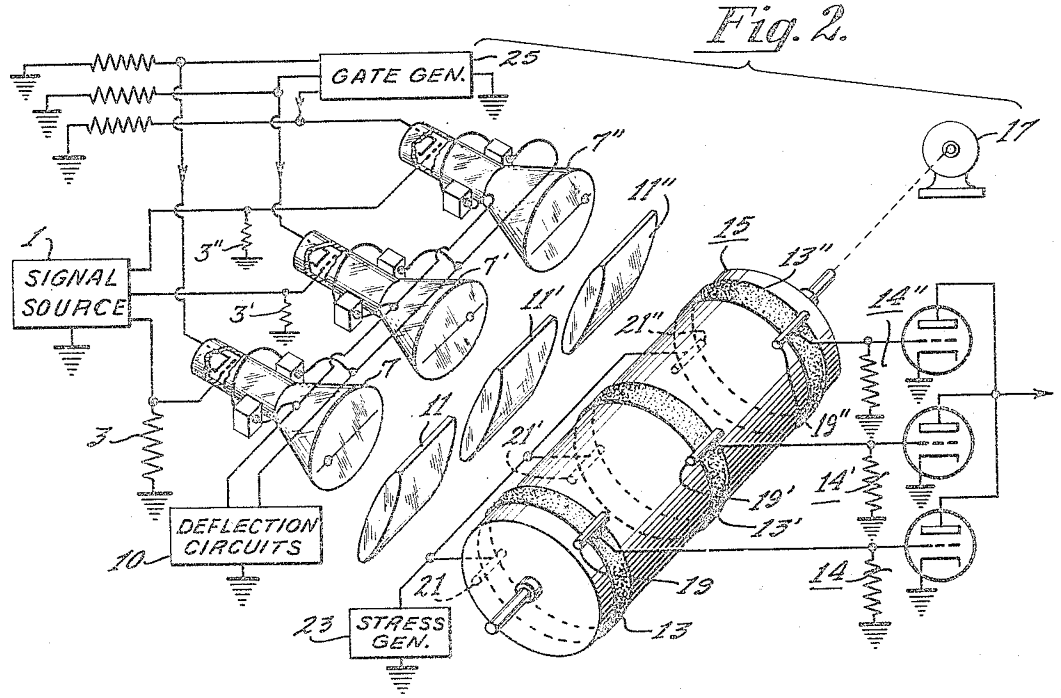
Figures 3, 4:
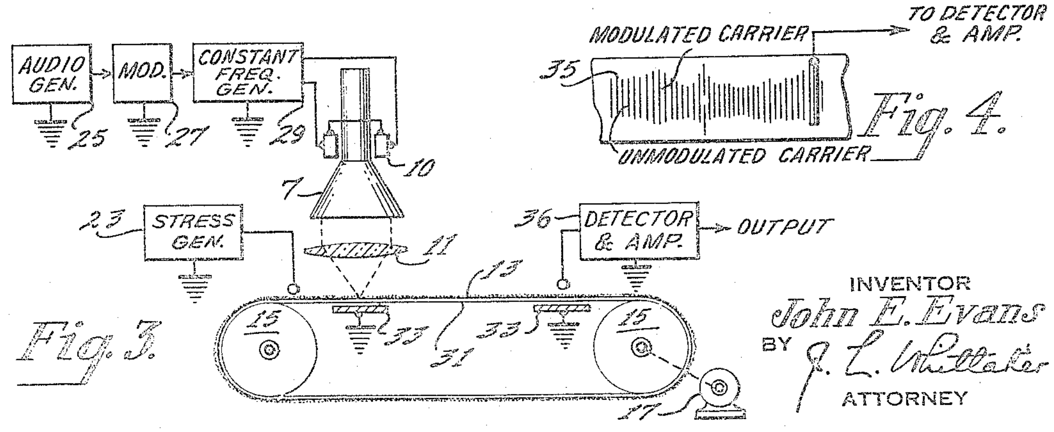

The invention will be described in detail with reference to the drawing in which Figure 1 is a schematic circuit diagram, partially in block form, of an electrostatic recording and reproducing system, according to the invention, utilizing a rotatable photoconductive storage element; Figure 2 is a schematic circuit diagram, partially in block form, of the electrostatic recording and reproducing system of the invention in which a plurality of rotatable photoconductive storage elements are utilized for separately recording and delaying different sets of sequentially occurring events; Figure 3 is a schematic diagram, partially in block form, of a conveyer belt type embodiment of the invention; and Figure 4 illustrates the manner in which signals are stored in the system of Figure 3.

Similar reference characters are applied to similar elements throughout the drawings.

Referring to Figure 1 of the drawing, electrical signals produced by a signal source 1 are developed across an impedance device 3 coupled to a beam control electrode 5 of a flying spot scanning tube 7. The flying spot tube 7 is preferably a scaled down version of a 5ZP16 (Radio and Television Manufacturers Association designation) in which the tube phosphor 9 produces an ultra-violet light output corresponding in time and in intensity to electrical signals applied thereto. The deflection circuitry 10 is such that the flying spot is deflected only in the horizontal direction. The ultra-violet light signals thus produced are focused, by means of a cylindrical lens 11, from a spot into a line onto a photoconductor 13 which is circumferentially disposed about a drum 15 preferably driven at a constant angular velocity by a motor 17. If desirable conventional deflection circuitry may be utilized and the raster scanning produced may similarly be focused to a line type signal indication. The materials chosen for the photoconductor 13 and the drum 15 are here selected to be selenium and aluminum, respectively, and are preferred since an oxide forms between these two materials and forms a very satisfactory isolator for the photoconductor.

The cyclical operation of the system is as follows: Assuming that the drum 15 is rotating clockwise and that the photoconductive selenium 13 is initially electrically stressed, the focusing of the ultra-violet light upon a finite portion of the selenium at a time to cause the stresses set up in said portion to be discharged and thus record a signal corresponding to a particular electrical impulse.

At some later time, $t_1$, the signal stored on the rotating drum 15 is detected by a collector probe 19, preferably a chemically inert material such as nickel, disposed next adjacent but not in contact with the photoconductor 13, and subsequently is amplified in an amplifier 14. It is apparent that the collector probe may be physically positioned about the drum's periphery to provide substantially any desired amount of time delay. In the continued rotation of the drum, at time $t_x$ the discharged photoconductor 13 (selenium) passes adjacent another probe 21 which is connected to a stress generator 23. The stress generator 23 provides a high voltage output, for example of the order of 3000 volts, which when applied to this second, or stressing, probe restresses the selenium. The writing, reading, and erasing of the ultra-violet signals then takes place in 360° of the drum's rotation.

With reference to Figure 2, a plurality of equispaced equi-diameter photoconductive elements 13, 13′, and 13″ are preferably disposed about the periphery of a single drum 15 which is rotated at a predetermined angular velocity. Each of the photoconductive elements 13, 13′, and 13″ is separately responsive only to ultra-violet light produced by flying spot tubes 7, 7′, and 7″ respectively associated therewith. Cylindrical lenses 11, 11′, and 11″ are again preferably provided for focusing the ultra-violet signals into corresponding lines of light energy for recording on the selenium. A gate generator 25 is provided for separately enabling each of the flying spot tubes 7, 7′, and 7″.

Different sets of electrical signals produced by the source 1 may then be separately delayed on each of the aforementioned photoconductive elements. The individual time delays obtained by the suitable positioning of each of the collector probes 19, 19′, and 19″ may be selected to combine the different sets of gated signals in a desired manner. Separate amplifier devices 14, 14′, and 14″ are herein illustrated having commonly connected anodes for the combination of said recorded signals. It may be seen from the foregoing description of the instant invention that different sets of sequentially occurring events may be separately delayed to subsequently produce a simultaneous output.

The resolution of the present system is directly proportional to the peripheral dimension of the drum 15, to the angular velocity of its rotation and inversely proportional to the width of the collector probe 19. Thus, between prescribed limits, the system resolution may be controlled substantially as desired.

In Figure 3, a conveyor belt type electrostatic recording and delay system is disclosed. Audio signals produced by a source 25 are coupled to a modulator 27 which amplitude-modulates a constant frequency signal generator 29. The output circuits of the constant frequency generator 29 are coupled to the deflection circuits 10 of a flying spot scanning tube 7. The flying spot tube again is preferably a scaled down 5ZP16. The ultraviolet light produced thereby is focused by a cylindrical lens 11 onto a photoconductor 13, for example selenium, which is disposed about a closed loop cellulose conveyor belt 31. The closed loop belt is preferably supported by a pair of cylindrical drums 15 and 15' and is driven at some predetermined speed by a motor 17. A dielectric plate 33 is disposed next adjacent the under-side of the cellulose belt 31 whereon the ultra-violet signals are focused to provide a flow path for capacity current generated in response to said focusing. A stress generator 23 and probe 21 are provided for stressing the photoconductor 13 before recording signals thereon.

Figure 4 illustrates the manner in which the audio signals originally produced are translated into photoconductively stored signals. The constant frequency generator carrier 35 appears on the recording medium as a line of recorded energy which is of given length. The modulation of this generator 29 by audio signals varies the deflection angle of the flying spot tube 7 and accordingly increases or decreases the line length. Separated from the recording point by a distance determined by the amount of system time delay required, a collector probe 19 successively couples the recorded and delayed signals to detector and amplifier circuits 36 and to other circuitry (not shown) for further utilization as desired.

It is apparent that this mode of practicing the instant invention affords long time storage, perhaps for several weeks, of electrical data. Since the decay response of most photoconductors is such that high and low level signals tend to decay at different rates, normal recording of signals is hindered. By translating signal amplitude variations into variations in deflection of the flying spot tube electron beam, the signal potential of the photoconductor remains constant while the data recorded thereon appears as a line width variation. The data which has been recorded as above described may be wound upon a reel for future use. Since the level of the recorded signals is fixed by the amount of ultra-violet light produced by the flying spot tube phosphor and since the signal intelligence to be recorded has been converted into variations in deflection of the flying spot electron beam, the decay of recorded signals over an extended period of time does not substantially affect the subsequent reproduction of said signals since all signals thus recorded decay at substantially identical rates.

What is claimed is:

1. An electrostatic recording and reproducing system comprising, connection means for a source of electrical signals, means for translating electrical signals appearing at said connection means into corresponding light-ray signals, an initially stressed movable photoconductive storage member, means for moving said photoconductive storage member past said translating means at a predetermined angular velocity so that said light-ray signals discharge stresses in areas of said initially stressed photoconductive member whereon said light-ray signals are incident, an electrostatic pickup member adjacent said photoconductive member spaced from said translating means for reproducing said electrical signals in response to proximity of said pickup member to discharged areas of said photoconductive member, and an electrostatic erasing member spaced from said translating means and said electrostatic pickup member for re-stressing said discharged areas of said photoconductive member after reproduction of said electrical signals.

2. An electrostatic recording and reproducing system comprising, separate connection means for a plurality of different sets of electrical signals, a plurality of signal translating means one each being coupled to one of said connection means for translating a set of electrical signals appearing at one of said connection means into corresponding light-ray signals, a plurality of initially stressed movable photoconductive members one each being responsive to light-ray signals produced by one of translating means, means for moving each of said photoconductive storage members past an associated translating means at a predetermined angular velocity so that said light-ray signals discharge stresses in areas of said initially stressed photoconductive members whereon said light rays are incident, a plurality of electrostatic pickup members each of which is adjacent one of said photoconductive members and spaced from its associated translating means for reproducing in response to its proximity to discharged areas of said adjacent photoconductive members the set of electrical signals initially translated by said associated translating means, electrostatic erasing means spaced from each of said translating and pickup means for re-stressing said discharged areas of said photoconductive members after reproduction of said different sets of electrical signals, and means coupled to said pickup members for combining said reproduced signals.

3. An electrostatic recording and reproducing system comprising, connection means for a source of electrical signals, cathode ray means, deflection means for said cathode ray means responsive to electrical signals appearing at said connection means whereby the angle of deflection of said deflection means is modulated in accordance with said electrical signals, an initially stressed movable photoconductive storage member, means for moving said photoconductive storage member past said cathode ray means at a predetermined angular velocity so that light-ray signals produced by said cathode ray means discharge stresses in areas of said photoconductive member whereon said light-ray signals are incident, an electrostatic pickup member adjacent said photoconductive member spaced from said translating means for reproducing said electrical signals in response to proximity of said pickup member to discharged areas of said photoconductive member, and an electrostatic erasing member spaced from said translating means and said electrostatic pickup member for restressing said discharged areas of said photoconductive member after reproduction of said electrical signals.

4. A system as claimed in claim 2 wherein said plurality of photoconductive storage members comprise a plurality of equispaced equi-diameter photoconductive storage elements having a common transverse axis which elements are each circumferentially disposed about the periphery of a cylinder, said cylinder being rotated at said predetermined angular velocity.

5. A system as claimed in claim 4 wherein said electrostatic probes are each disposed next adjacent said circumferential storage elements, the relative time delay of signals stored by said elements being indicated by the physical placement of said probes about said periphery.

6. A system as claimed in claim 3 wherein said means coupled to said deflection means comprises a constant frequency signal generator and wherein said electrical wave signals amplitude-modulate the output of said generator.

References Cited in the file of this patent

UNITED STATES PATENTS

| | | |
|---|---|---|
| 1,997,556 | Bryant | Apr. 9, 1935 |
| 2,175,388 | Gurley | Oct. 10, 1939 |
| 2,220,488 | Lott | Nov. 5, 1940 |
| 2,221,776 | Carlson | Nov. 19, 1940 |
| 2,297,398 | Fries | Sept. 29, 1942 |
| 2,422,140 | Sinnett | June 10, 1947 |
| 2,473,729 | Salz | June 21, 1949 |

FOREIGN PATENTS

| | | |
|---|---|---|
| 153,300 | Great Britain | Feb. 1, 1922 |